May 1, 1973 — G. H. MILLY — 3,730,683
METHOD OF PROSPECTING FOR MERCURY AND ASSOCIATED NOBLE AND BASE
Filed March 17, 1971 — 8 Sheets-Sheet 1

PROSPECTING FOR MERCURY

— STREAM LINES
--- RIDGE LINES
→ SLOPE WINDS
⟶ VALLEY WINDS

INVENTOR
GEORGE H. MILLY

BY David H. Semmes
ATTORNEY

May 1, 1973  
G. H MILLY  
3,730,683  
METHOD OF PROSPECTING FOR MERCURY  
AND ASSOCIATED NOBLE AND BASE  
Filed March 17, 1971  
8 Sheets-Sheet 2
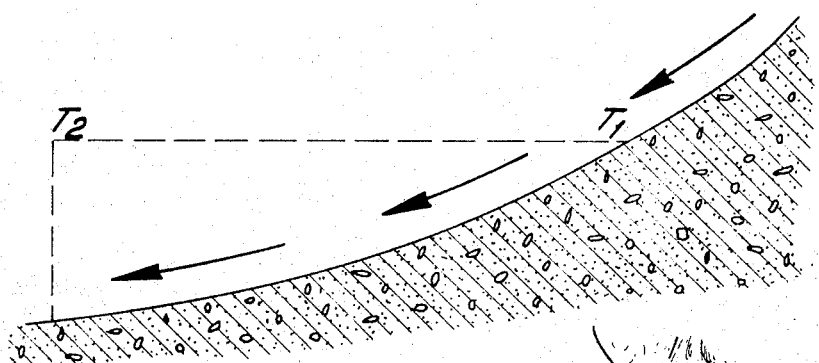
FIG. 4
FIG. 5
FIG. 6
INVENTOR  
GEORGE H. MILLY  
BY  
ATTORNEY

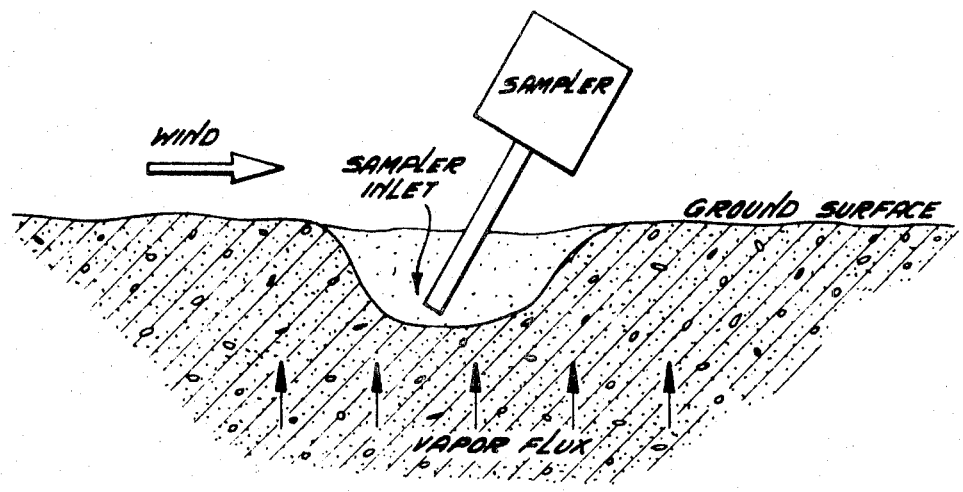
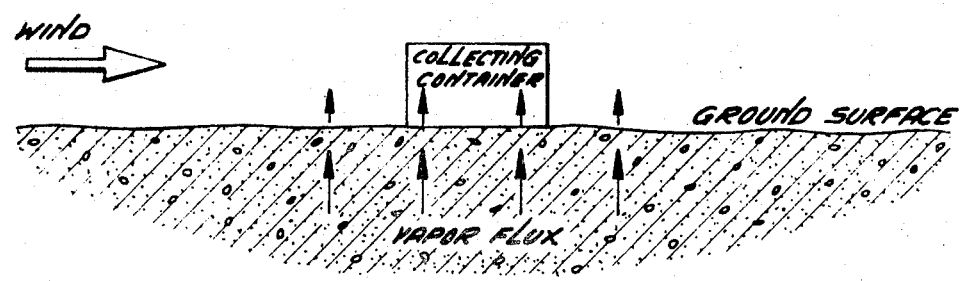
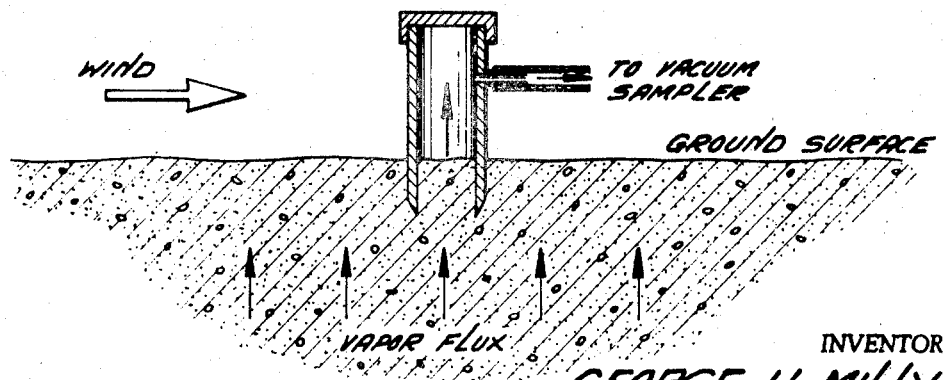
FIG.9

DETECTION OF ANOMALIES DURING PORTABLE SAMPLING IN WOODED AREA

May 1, 1973                  G. H. MILLY                3,730,683
METHOD OF PROSPECTING FOR MERCURY
AND ASSOCIATED NOBLE AND BASE
Filed March 17, 1971                                          8 Sheets-Sheet 7

DETECTION OF ANOMALY DURING
MOBILE SAMPLING ALONG ROADWAY

INVENTOR
GEORGE H. MILLY

BY

ATTORNEY

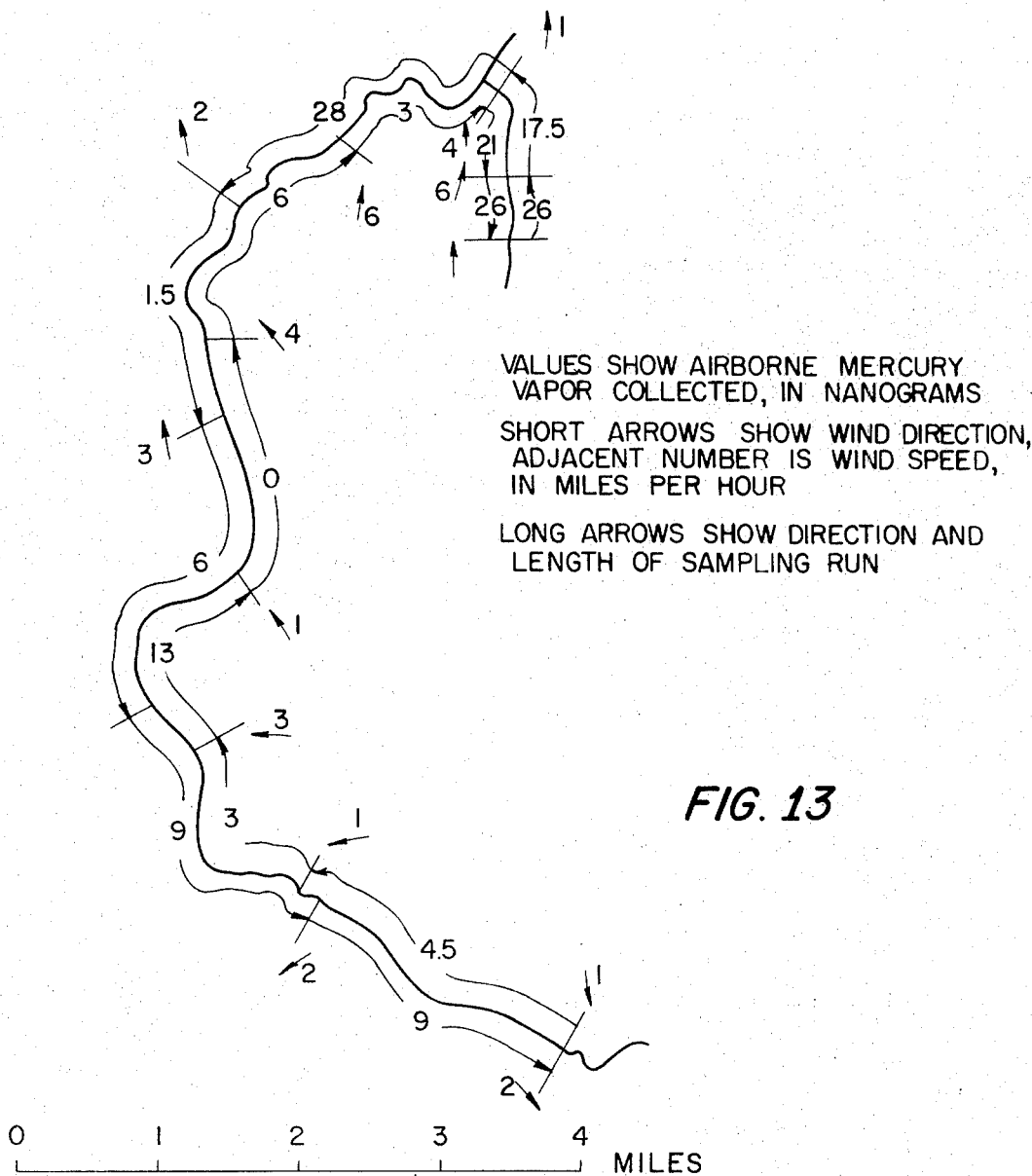

United States Patent Office 3,730,683
Patented May 1, 1973

3,730,683
METHOD OF PROSPECTING FOR MERCURY AND ASSOCIATED NOBLE AND BASE METALS
George H. Milly, Potomac, Md., assignor to Geomet Mining and Exploration Company, Rockville, Md.
Continuation-in-part of application Ser. No. 804,219, Mar. 4, 1969, now Patent No. 3,609,363, dated Sept. 28, 1971. This application Mar. 17, 1971, Ser. No. 125,084
Int. Cl. G01n 33/24
U.S. Cl. 23—230 EP      5 Claims

ABSTRACT OF THE DISCLOSURE

Prospecting, particularly prospecting for mercury and noble and base metals such as gold, silver, copper, zinc, and other metallic ores encountered in association with mercury, on the basis of the mobile gaseous phase of mercury which diffuses through the earth's structure and becomes windborne.

CROSS-REFERENCES TO RELATED APPLICATIONS

A continuation-in-part of applicant's earlier filed Ser. No. 804,219, filed Mar. 4, 1969, now Patent No. 3,609,363, dated Sept. 28, 1971.

BACKGROUND OF THE INVENTION

(1) Field of the invention

Mercury, occurring as mercury ore alone or in association with gold, silver, copper, zinc, and other metallic ores, gives rise to free elemental mercury through geochemical and biochemical actions. The free mercury has a significant vapor pressure which gives rise to a mobile gaseous phase which diffuses through the earth's structure into the atmosphere, thereby serving as an indicator of the presence of mercury ore. Since mercury is commonly found in association with gold, silver, copper, zinc, and other metallic ores, the mercury vapor phase also serves as an indicator of the presence of these ores. Conventional prospecting techniques include traversing the earth's structure with a magnetometer which measures variations in the local magnetic field, or the use of induced polarization surveys which reflect the distribution of sulfide ores as an indicator of other ore presence. Shortcomings of these techniques include short operational range, interference due to variations in subsurface structure, and blocking by overburden in the earth's surface. Another shortcoming of such techniques resides in the necessity for being physically present on the earth's surface, or airborne in the atmosphere, above that portion of the earth's surface at which the ore is located. There has been no prior art attention given to the use of mobile vapor phase tracking or the combination of such tracking with combining meteorological considerations. For example, no earlier inventors have proposed horizontal tracking of density flow of vapor phase emanations downwind of an ore deposit, then marking of the ore deposit as density flow and diffusion vertically of the vapor phase through the earth's structure coincide.

(2) Description of the prior art

There has been no prior patent which remotely suggests mobile tracking of a gaseous vapor phase by azimuthly charting a sector of density flow of gaseous phase, then horizontally tracking the density flow towards the ore deposit and marking the ore deposit as density flow and diffusing vertically from ore deposit coincide.

Measurement of mercury in the air and soil as an indicator during exploration for base and precious metal ore deposits has been an accepted technique for some time. Utilization of mercury vapor as a guide to buried ores was discussed by A. A. Saukov (Geochemistry of Mercury, Academy of Sciences, USSR, Moscow, 1946). More recently, H. E. Hawkes and S. H. Williston (Mining Congress Journal, December 1962, pp. 30–32); W. W. Vaughn and J. H. McCarthy, Jr. (Geological Survey Research, 1964, U.S. Geological Survey, Professional Paper, 501D, pp. D123–127); S. H. Williston (Eng. Min. Jour., 165, 98–101, 1964; Ultraviolet Radiation Absorption Analysis Apparatus for the Detection of Mercury Vapor in a Gas, U.S. Patent No. 3,178,572, 1965; Journal of Geophysical Research, 73, No. 22, 7051–7055, 1968); S. H. Williston and M. H. Morris (Method and Apparatus for Measurement of Mercury Vapor, U.S. Patent No. 3,173,016, 1965); W. W. Vaughn (U.S. Geological Survey, Circular 540, U.S. Department of the Interior, Washington, D.C., 1967); and J. H. McCarthy, W. W. Vaughn, R. E. Learned, and J. L. Meuschke (U.S. Geological Survey, Circular 609, U.S. Department of the Interior, Washington, D.C., 1969); have explored the significance of mercury determinations in mineral exploration and have indicated appropriate techniques and instrumentation. However, none of these studies involves or suggests tracking of the vapor phase as a means of vastly extending the range of the sensing principle.

DESCRIPTION OF THE INVENTION

Applicant prospects for mineral deposits of the type having a gaseous vapor phase which diffuses through the earth's structure into the atmosphere by initially sensing the gaseous phase in the atmosphere; discriminating between density flow of gaseous phase arising from ore bodies and that from ambient background, horizontally tracking the density flow towards the ore deposits and marking the ore deposits as density flow and diffusion of gaseous phase through the earth's structure from said ore deposit coincide. Refinements of invention include initially conducting a line survey downwind of the area being prospected; outlining katabatic flow as a function of topography; estimating bulk atmospheric drift in heavily wooded areas on the basis of above-canopy wind direction; dust and vapor sampling during tracking, and capping of the earth's structure adjacent the diffusion of gaseous phase througth the earth's structure.

BRIEF DESCRIPTION OF THE DRAWINGS

FIG. 4 is a chart showing the development of slope winds within a valley of the topographic sector shown in FIG. 3;

FIG. 5 is a schematic illustration of tracking "upstream" according to the katabatic wind flow shown in FIGS. 3 and 4;

FIG. 6 is a schematic view of line survey tracking downwind of an area being prospected;

FIG. 9 is a schematic view showing capping of the earth's structure about a projected ore deposit including vacuum sampling and measuring vapor phase emanation as a function of diffusion vertically through the earth's structure;

FIG. 13 shows the results of another day's reconnaissance measurement of mercury vapor in conjunction with an extensive copper exploration program in Arizona, and illustrates the detection of anomalies.

BRIEF DESCRIPTION OF THE PREFERRED EMBODIMENTS

Applicant's method is based upon the detection and tracking of airborne clouds of gaseous mercury in the atmosphere, these clouds arising from the vapor pressure associated with free metallic mercury contained in the ores in the ground to produce a mobile vapor phase which diffuses through the earth's structure into the atmosphere. The airborne gas can then be detected by means of observations over the ground surface and at points removed from the deposit; and these observations can then be related to the location of the deposit by meteorological considerations. Because of the diffusivity of the gaseous phase through the ground, detection of deposits at depth, without recourse to drilling becomes possible, and because of the travel of the gaseous cloud with the wind after diffusion into the atmosphere, detection of deposits can be accomplished at distances which are considered great by the standards of normal prospecting methods. Furthermore, by application of the principles of micrometerology, advantage can be taken of the occurrence of conditions under which confluence of wind from vast regions prevails, rendering it possible thereby to scan comprehensively the entire region by measurements made at a single point.

Figure 1:
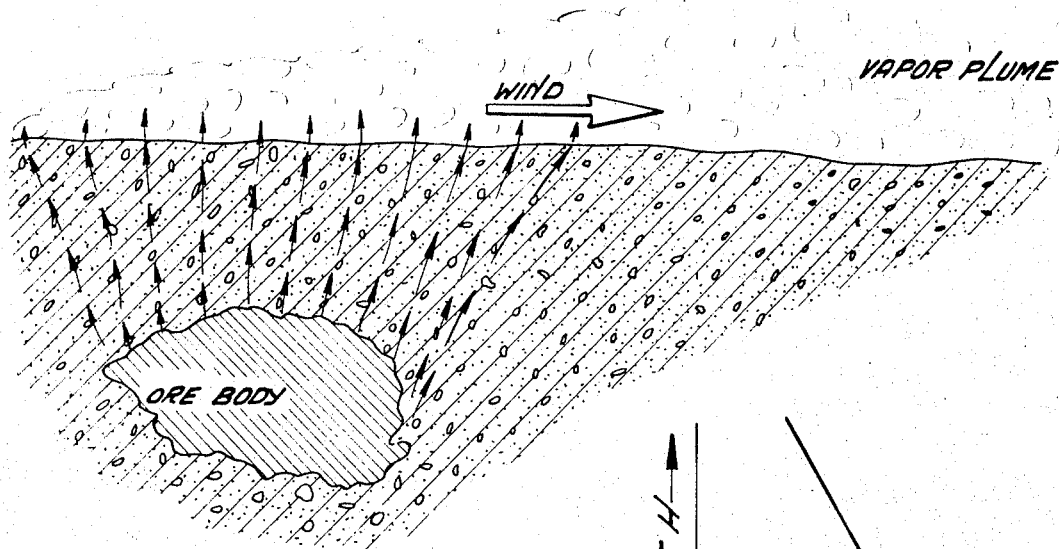
FIG. 1 is a schematic view showing diffusion of gaseous phase products from the ore deposit through the earth's structure and into the atmosphere where it becomes airborne.
Figure 2:
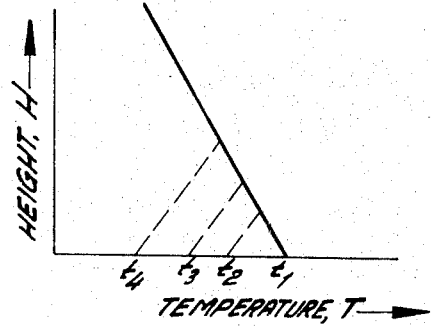
FIG. 2 is a graph depicting formation of the low level temperature inversions under which the desired katabatic or density flow conditions occur.
Figure 3:
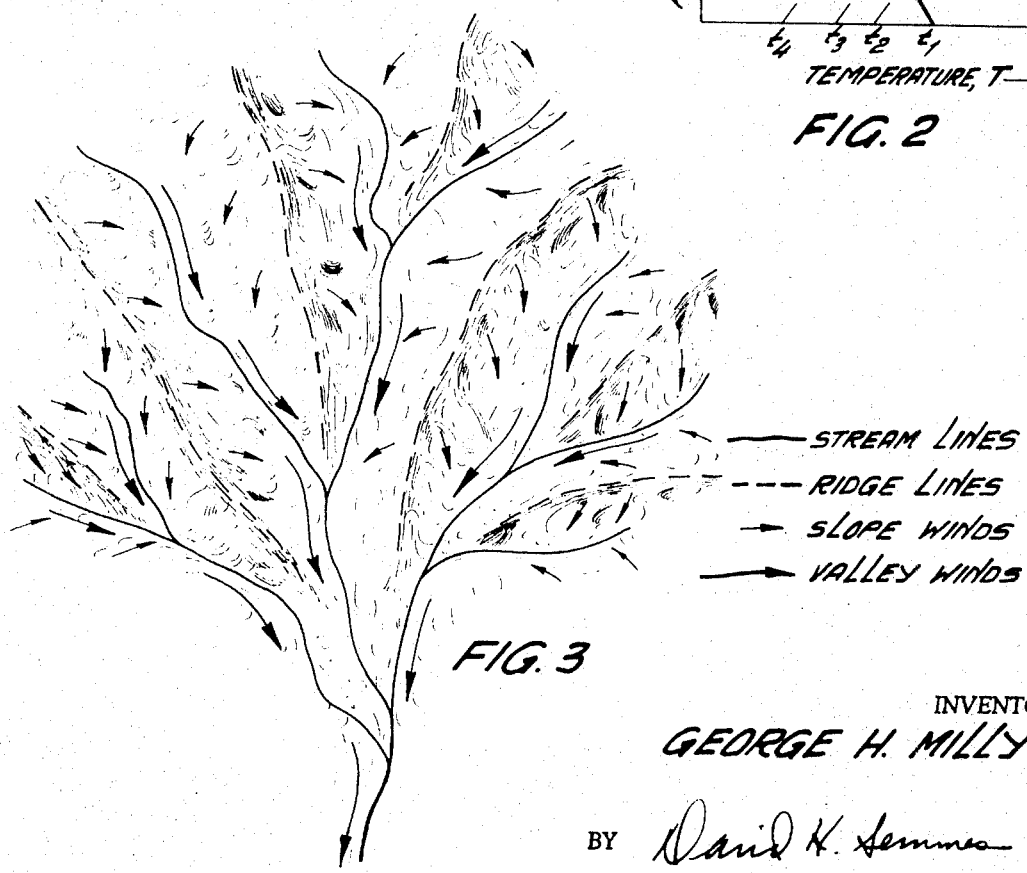
FIG. 3 is a schematic view showing katabatic wind drainage within a given topographic sector.
Figure 7:
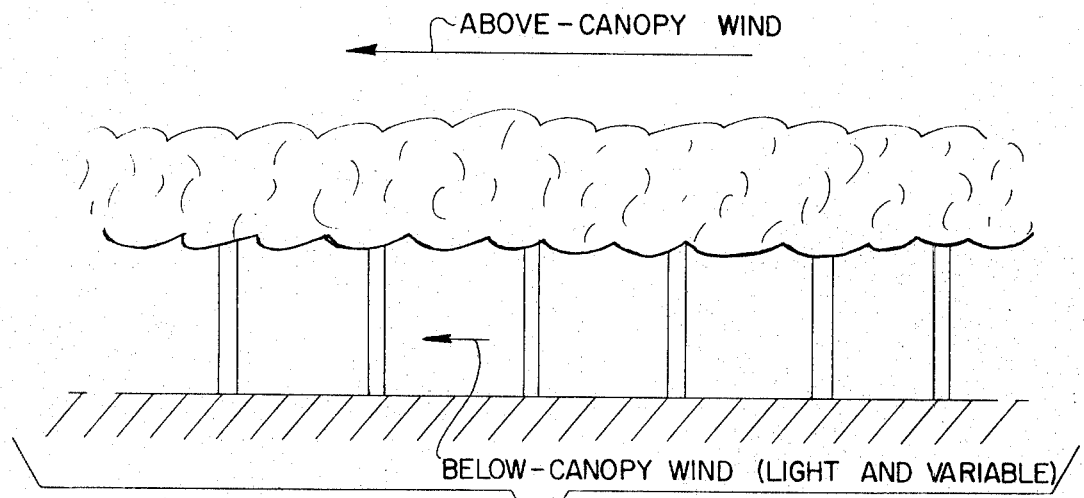
FIG. 7 is a schematic illustration of the relation between above-canopy wind and below-canopy wind in a heavily wooded area.
Figure 8:
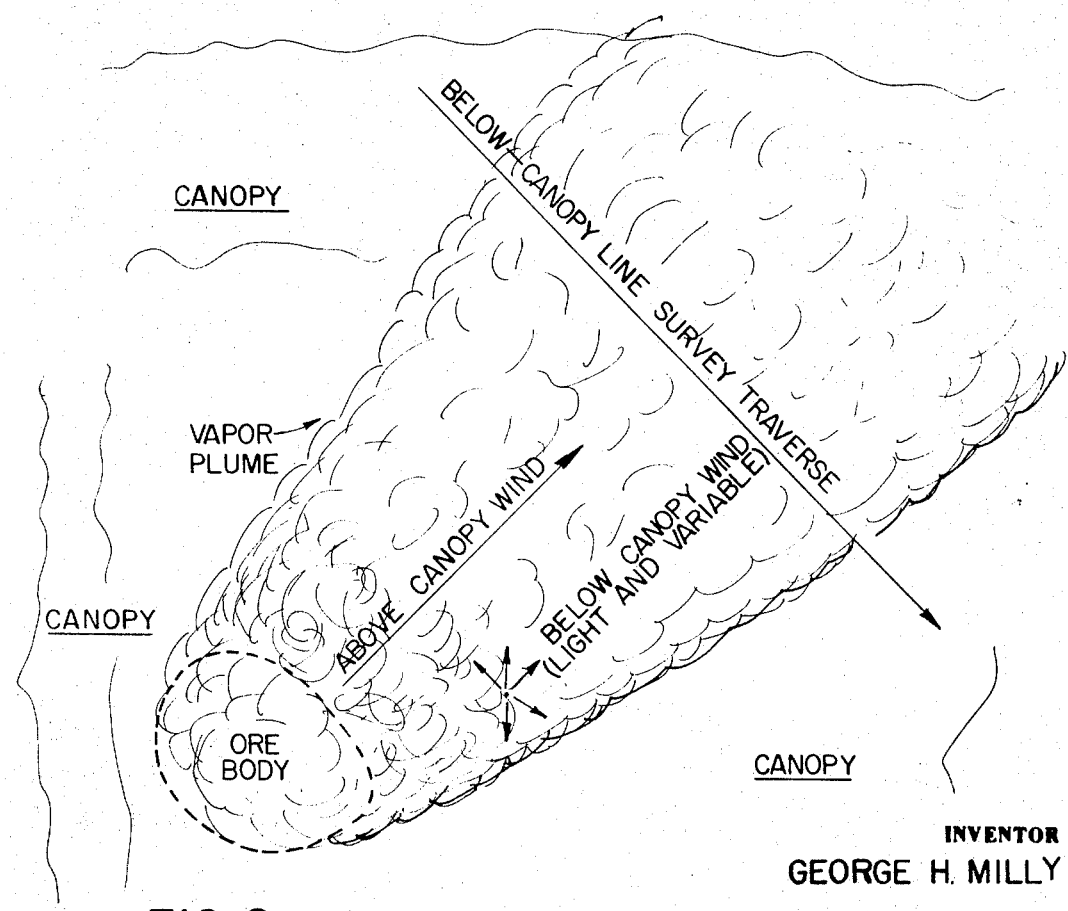
FIG. 8 is a schematic illustration of line survey tracking downwind of the bulk drift of below-canopy vapor plume from an ore body, as controlled by the above-canopy wind.
Figure 10:
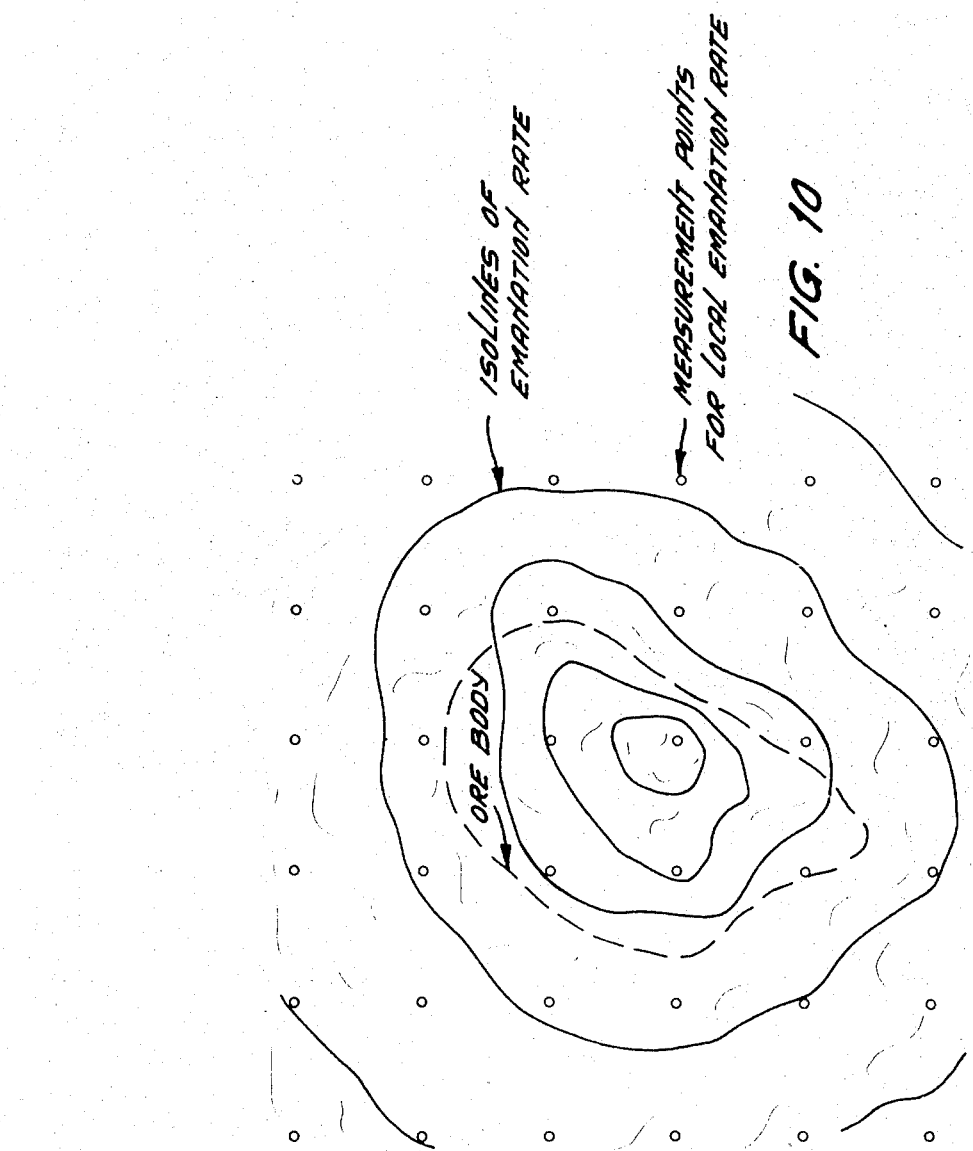
FIG. 10 shows mapping of said gaseous diffusion, according to FIG. 8.

An essential element in the successful employment of this technique is the application of meteorological knowledge, concerning cloud travel and dilution, to govern the observational regime and the interpretation of measurements. To achieve success, measurements must ordinarily be made under those conditions (which commonly occur) that give rise to concentration of the products in the lower atmospheric layers. This is readily done by taking advantage of low level temperature inversions arising particularly from ground surface radiation such as illustrated in FIG. 2. There, time frames $t_1-t_4$ are designated to illustrate the formation of cool, dense air layers adjacent the earth's surface, beginning at sunset. Further, under these conditions katabatic, or density, airflow occurs and under synoptic anticyclonic conditions with weak geostrophic pressure gradients, the airflow will be determined by the topographic relief. The result is that confluence of katabatic flow occurs in precisely the same manner as the hydrologic drainage of watersheds, and entire valley systems may be surveyed by measurements at the valley mouth. Successive measurements up-valley will serve to progressively eliminate subsidiary valley systems from consideration or identify them as major contributors. Continued up-valley study can then identify the region of the cloud source and, hence, the responsible ore.

Strong relief is not required for successful application and other variations of survey technique are readily employed even for very flat country.

For example, continuous monitoring at a fixed point over sufficiently long time to characterize all wind directions will provide a survey of the surrounding countryside for distances of the order of miles. Similarly, continuous measurements along a line survey (as following a road) will scan the country to the upwind side of the line. In all cases, however, it is necessary that competent consideration be given to the meteorological factors which govern the efficiency with which the initial emanations are concentrated and with which subsequent travel and turbulent dilution processes occur.

In some circumstances, the development of katabatic or density flow is inhibited and other techniques must be employed in order to determine the direction of flow from which the sampled vapor has come. In particular, this problem arises in moderate to heavily wooded terrain. Under these conditions, marked radiation inversions resulting in density flow are much less readily formed. Wind speeds under the canopy are very light and variable, averaging generally less than one mile per hour. Where topographic relief is slight, the definition of the flow under the canopy by ordinary wind sensing instrumentation is virtually impossible. Nevertheless, despite the locally highly variable apparent wind directions under the canopy, there is a bulk mean drift of air which parallels the above-canopy flow. This results from turbulent coupling which provides the mechanism whereby the driving force of the above-canopy wind is impressed on the below-canopy air, resulting in its drift and controlling its direction of bulk flow. Measurements of mercury vapor concentrations in heavily wooded areas of low relief may, therefore, be tracked to the source by relating them to the above-canopy wind direction.

The method of measuring the concentration of mercury vapor at a point in the atmosphere is based on obtaining a sample of vapor and dust from the atmosphere in a concentrated form suitable for analysis of the mercury content of the sample. The sample may be collected and analyzed in various ways including, for example: (a) observing the darkening reaction upon filtration of air through paper coated with selenium sulfide, and (b) amalgamation of the mercury upon filtration through granular beds or wool packs of noble metals, or by collection on a rotating noble metal grid as, for example, in assignee's copending application entitled, "Mercury Air Sampler for Geological Studies," Ser. No. 32,918, filed Apr. 29, 1970 and issued July 20, 1971, as Patent No. 3,593,583, followed by thermal boil-off of the mercury vapor and estimation of the mercury vapor by measurement of its optical absorption at the wavelength of a mercury resonance line (253.7 nm., usually) in an ultraviolet photometer.

After detection and general localization of an area of interest, further adaptation of the technique may be employed to outline more precisely the ore body itself. By capping the emanating soil surface so as to trap the gaseous vapor phase, at a succession of points over the area in question, and measuring the content so derived, contour analysis of the results will aid in ore body definition.

EXPERIMENTAL

The following examples are extracted from field experiment notes to indicate the nature of the experimental verification completed to date and the characteristics and potential worth of the technique.

(1) Experiments in Ontario, Canada

A series of experiments was conducted on a gold prospect in Ontario, Canada. The prospect, comprising an area of 2280 acres, was initially surveyed by induced polarization (I.P.) techniques. The I.P. survey showed large, well-defined anomalies indicative of sulfide deposits. Limited drilling showed mineralized bedrock overlain by approximately 100–150 feet of sand and gravel.

Since the area was heavily wooded, wind speeds under the canopy were very light and variable, and use was made of the above-canopy wind direction for tracking purposes, as described above.

Sampling lines were cut through the bush to permit walking with portable sampling equipment. Sampling of the below-canopy air was done along these lines during meteorological conditions of maximum stability conducive to minimum diffusion and, hence, highest concentrations of mercury vapor. Lines were selected for sampling so as to be generally crosswind with respect to the above-canopy wind direction in each instance, although the wind was rarely perpendicular to the pre-cut bush lines.

Figure 11:
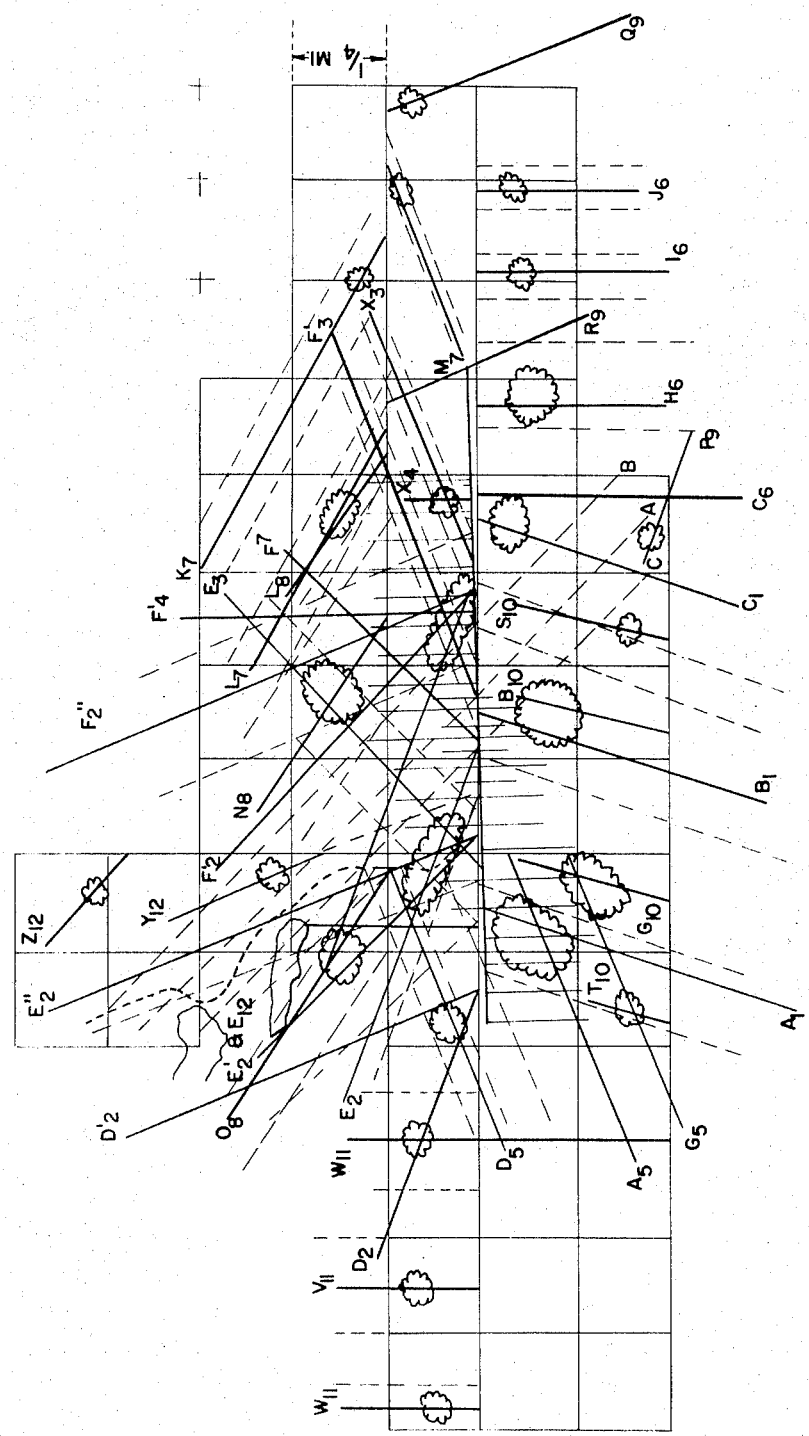
FIG. 11 shows the projections which locate mercury vapor source regions, derived from an extensive survey program in a heavily wooded area in Ontario, Canada.

The sampling was conducted by a team of men, each assigned to walk a segment of the line, so that all portions of the line were concurrently traversed. A series of sixty-one such crosswind line surveys was conducted in twelve days of operation when meteorological conditions were suitable. The sampling lines varied between 3500 feet and 7920 feet, depending on the portion of the area being surveyed, and totalled approximately 72,000 feet for all sampling traverses. During the entire series, a variety of wind directions prevailed so that by repetitive sampling over certain lines, it was possible to locate anomalous sources by triangulation involving projecting backward along the direction of bulk drift as inferred from the mean direction of the above-canopy wind. FIG. 11 shows a map of the anomalies so located and provided the basis for a subsequent drilling program.

In FIG. 11, letters A through Y identfy a particular anomaly and are attached to projection lines which correspond to the above-canopy wind. Inner terminus of the projection line is at the point where line survey samples detected the anomalous value. Numerical subscripts on the letter designators refer to the serial number of the day on which that observation was made. Balloons represent projected mercury vapor source regions. Soild projection lines labelled by letters represent the observed concentration peak. Parallel dashed lines to either side represent the approximate width of the anomaly as measured on the line sampling traverse.

(2) Experiments in Arizona

A series of surveys was made over a wide area of southern Arizona. Atmospheric mercury vapor sampling was employed as the first phase of reconnaissance in a copper exploration program. Mercury vapor served as an indicator of copper occurrence on the basis of its association with gold which is, in turn, associated with copper. The atmospheric mercury detected was tracked in order to identify its source regions, according to the techniques described in this disclosure.

The area is arid desert land, with minimal vegetation, and with prominent topographic features and terrain relief. Sampling was done while travelling by vehicle, and at fixed positions. Interceptions of mercury vapor anomalies were tracked to the source regions on the basis of density airflow associated with strong radiation inversions, weak geostrophic wind flow, and the prominent relief.

Figure 12:
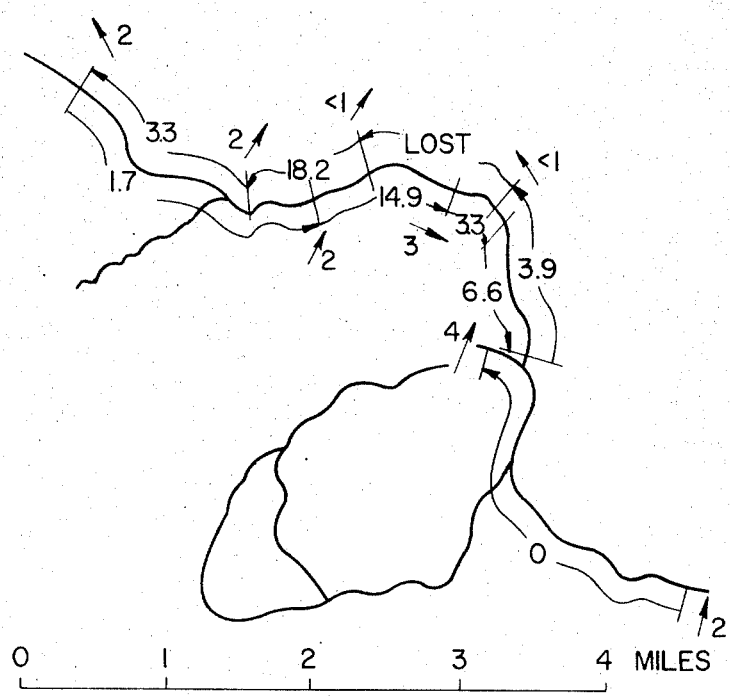
FIG. 12 shows the results of one day's reconnaissance measurement of mercury vapor in conjunction with an extensive copper exploration program in Arizona, and illustrates the detection of anomalies.

A series of sampling surveys was conducted during seventy-six days of operation when meteorological conditions were suitable. A total distance of approximately 2000 miles was sampled in the continuous moving vehicle reconnaissance surveys; a total of 1360 moving samples were obtained and analyzed. These observations were augmented by 173 fixed position observations in the process of tracking and localization following initial interception during reconnaissance. FIGS. 12 and 13 are examples of two days' survey results wherein initial detection of anomalous concentrations of atmospheric mercury vapor was encountered in the course of taking running samples along roadways. On the basis of these reconnaissance surveys, tracking and localization surveys, and fixed point measurements, a total of nine anomalies were discovered. Geological and soil geochemical evidence has corroborated these findings and led to a land acquisition and development program.

Manifestly, various instrumentation may be employed in sensing, tracking, and marking according to applicant's method without departing from the spirit of the invention.

I claim:

1. Method of prospecting for mineral deposits of the type in which free elemental mercury is present and in which a mercury vapor phase diffuses vertically through the earth's structure into the atmosphere, comprising:
    (A) sensing at night said mercury phase in the atmosphere along the earth's surface and under katabatic conditions determined by topographic relief downwind of the area being prospected and temperature inversions;
    (B) charting an azimuthal sector of density flow of said mercury vapor above the earth's surface;
    (C) horizontally tracking said density flow along the earth's surface towards the deposit from which it has diffused; and
    (D) marking said deposit within the earth, as said density flow and diffusion vertically from said deposit coincide.

2. Method of prospecting as in claim 1, wherein said sensing is done from a fixed point with respect to proposed mineral deposits, said tracking is correlated with ambient wind conditions, and including marking of a projected deposit from said fixed point, gaseous phase density flow and diffusion vertically being projected as a function of ambient wind in the flow being tracked.

3. Method of prospecting as in claim 1, wherein said sensing is done within heavily wooded areas, from a fixed point with respect to proposed mineral deposits, said tracking being correlated with ambient above-canopy wind conditions as a means of estimating bulk drift of the below-canopy air mass, and including marking of a projected deposit from said fixed point, gaseous phase effective flow and diffusion vertically being projected as a function of the governing above-canopy wind related to the below-canopy flow being tracked.

4. Method of prospecting as in claim 1, wherein said sensing is done within heavily wooded areas by a line survey downwind of the area being prospected; said tracking being correlated with ambient above-canopy wind conditions as a means of estimating bulk drift of the below-canopy air mass, and including marking of a projected deposit from said line survey, gaseous phase effective flow and diffusion vertically being projected as a function of the governing above-canopy wind related to the below-canopy flow being tracked.

5. Method of prospecting for mineral deposits as in claim 1, wherein said sensing includes discriminating between density flow of said mercury phase arising from ore bodies and any ambient flow of mercury.

References Cited

UNITED STATES PATENTS

| 2,348,103 | 5/1944 | Beckman | 23—230 EP |
| 2,370,793 | 3/1945 | Horvitz | 23—230 EP |
| 3,143,648 | 8/1964 | Bradley et al. | 23—230 EP |
| 3,173,016 | 3/1965 | Williston et al. | 250—218 |
| 3,609,363 | 9/1971 | Milly | 250—83 SA |

MORRIS O. WOLK, Primary Examiner

R. M. REESE, Assistant Examiner